Nov. 17, 1925.  1,561,621
C. McG. SYKES
INDICATING MECHANISM OF WEIGHING APPARATUS
Filed Oct. 1, 1923    2 Sheets-Sheet 1

Inventor:—
Cameron McG. Sykes
by George E. Folkes,
his Attorney.

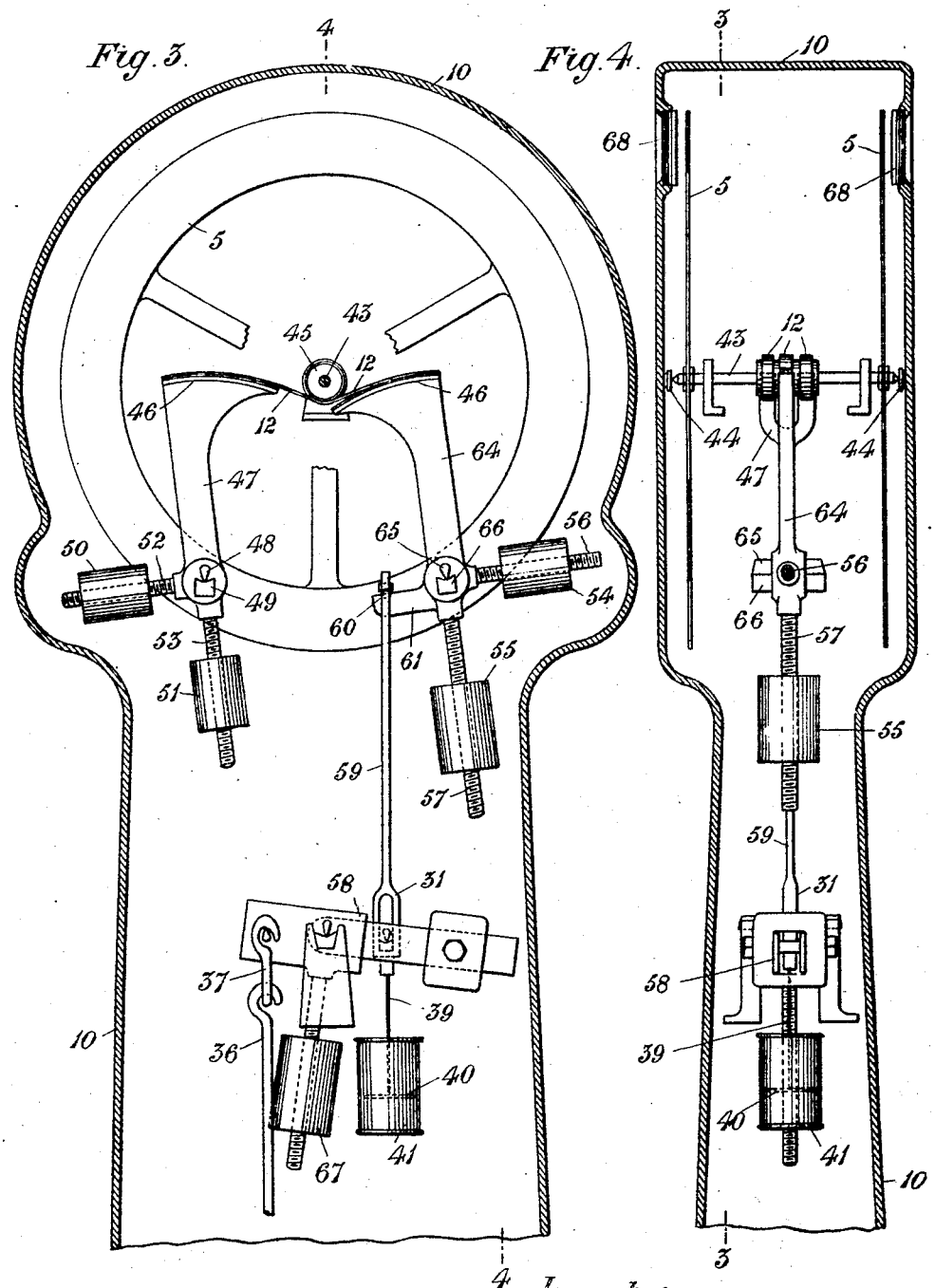

Patented Nov. 17, 1925.

1,561,621

UNITED STATES PATENT OFFICE.

CAMERON McGREGOR SYKES, OF BIRMINGHAM, ENGLAND, ASSIGNOR TO W. & T. AVERY, LIMITED, OF BIRMINGHAM, ENGLAND.

INDICATING MECHANISM OF WEIGHING APPARATUS.

Application filed October 1, 1923. Serial No. 665,845.

*To all whom it may concern:*

Be it known that CAMERON McGREGOR SYKES, a subject of the King of Great Britain, residing at Soho Foundry, Birmingham, England, has invented a new and useful Improvement in or Relating to the Indicating Mechanism of Weighing Apparatus; and he does hereby declare the following to be a full, clear, and exact description of the same.

This invention has reference to improvements in or relating to the indicating mechanism of weighing apparatus and more particularly to pendulous weight resistant mechanism employed in conjunction with automatic weighing scales, and has for its object to increase the sensitivity of the indicating mechanism by the provision of an additional means of support for the rotatable member of the indicator whereby the bearings of this member are relieved of the greater part of the weight they would normally have to support, said additional support constituting the means of rotating the weight indicator.

The invention consists of an indicating mechanism for weighing apparatus characterized by the partial suspension of the rotatable indicator by means of oppositely wound flexible ribbons or the like which serve to cradle the said rotatable indicator, the said ribbons or the like being connected to a weight resistant member or members adapted to oscillate about a fixed axis and forming the means for rotating the said indicator.

Two means for carrying the present invention into effect are illustrated by the accompanying drawings, in which:—

Fig. 3 is a front elevation of a modified construction of the invention taken on line 3—3 of Fig. 4, and Fig. 4 is an end sectional elevation on line 4—4 of Fig. 3, with parts omitted for clearness of illustration.

Figure 1:
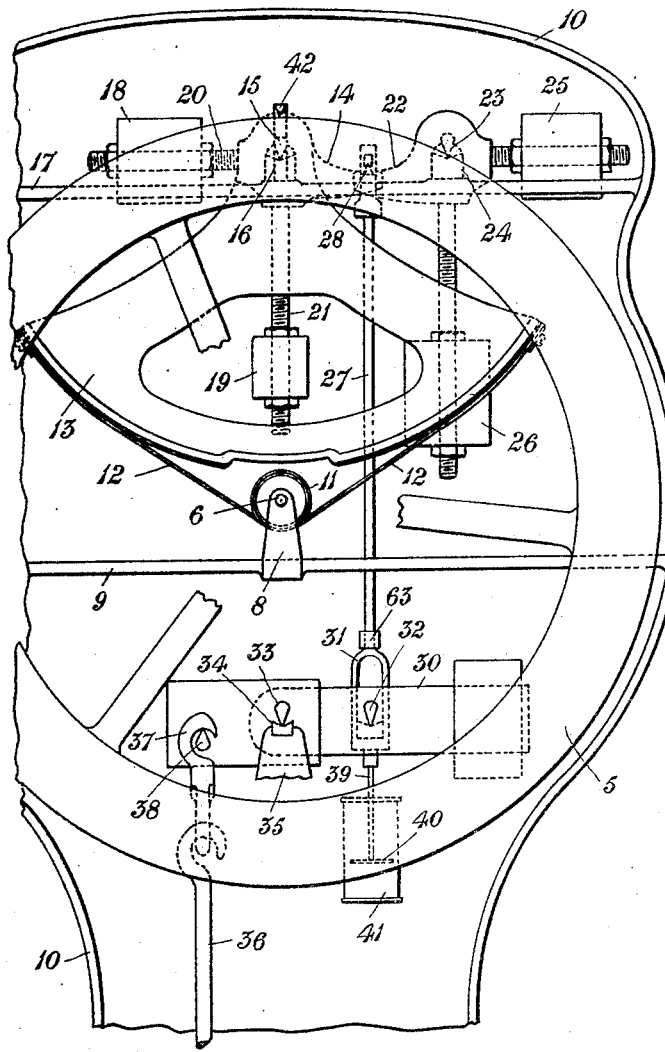
Fig. 1 is a front elevation of part of one construction of indicating mechanism according to this invention the front cover plate being removed for the sake of clearness.
Figure 2:
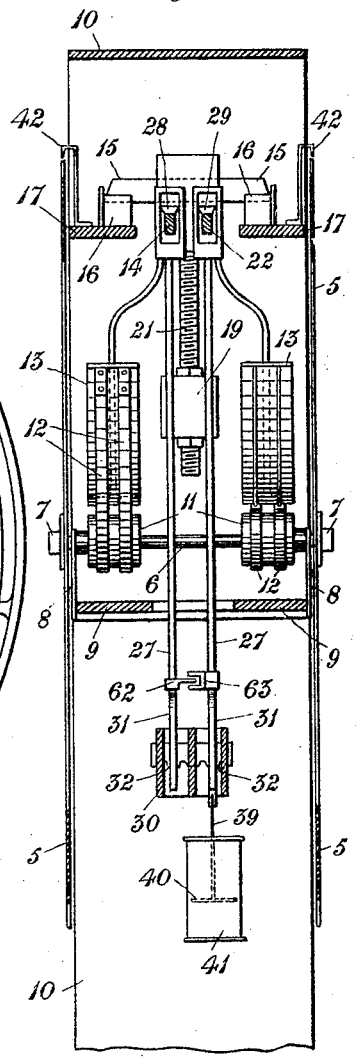
Fig. 2 is a part sectional end elevation of the mechanism seen in Fig. 1, with parts omitted for clearness of illustration.

Referring first to the construction seen in Figs. 1 and 2, the two dials 5 are secured to a rotatable spindle 6 mounted in end thrust bearings 7 which are carried by brackets 8 secured to a cross bar 9 attached to the scale housing 10. Mounted on the spindle 6 are two cylindrical drums 11 around which are passed oppositely wound flexible ribbons 12 the ends of which are secured to the segmental faces of a pair of similar pendulous segmental members 13, the said members forming part of the weighing resistant of the scale. The segmental members 13 are secured to a lever 14 which rocks about a knife-edge 15 mounted in bearings 16 carried on the brackets 17 mounted on the scale housing. A weight 18 is mounted on the arm 20 secured to the lever 14 and an adjustable pendulous weight 19 is mounted on the vertical arm 21 also secured to the lever 14. A second lever 22 is mounted on a knife-edge 23 carried by bearings 24, this lever is provided with a counterbalance weight 25 and an adjustable pendulous weight 26 which are respectively mounted on screwed arms connected to the lever 22 in a similar manner to that in which the weights 18 and 19 are connected to the lever 14. A pair of connecting rods 27 depend from aligned knife-edges 28 and 29 which are respectively mounted on the levers 14 and 22. These rods 27 are provided at their upper end with bearing shackles and at their lower ends are looped as shown at 31 to form a lost motion linkage by means of the knife-edge 32 with an intermediate lever 30 the two rods 27 being coupled together to obtain uniformity of motion by means of the projection 62 on the one rod which engages within the jawed projection 63 on the other rod.

The lever 30 is mounted on a knife-edge 33 supported in bearings 34 mounted in a bracket 35 this lever in turn being connected by means of the knife-edge 38 and shackle 37 with the connecting rod 36 which is connected to the bottom levers of the weighing machine. One of the rods 27 is connected by means of a pivotally mounted piston rod 40 disposed within a cylinder 41 adapted to contain liquid and serving to determine the speed of motion of the connecting rods 27 and the levers 14 and 22. Mounted on the bracket 17 are fixed index pointers 42 which register against graduations on the rotatable dials 5.

The ribbons 12 are initially tensioned in the assembling of the scale mechanism so that the greater part of the weight of the indicating mechanism is supported by the said ribbons, the bearings 7 merely serving to preserve a determined rotational axis for the spindle of the dials and to prevent any oscillatory motion thereof.

In operation the connecting rod 36 through the intermediate lever 30 and rods 27 transmit motion to the pendulous levers 14 and 22 and to the pendulous segment 13 which results in a rotational movement being imparted through the ribbons 12 to the drums 11 mounted on the spindle 6, thereby rotating the dials 5 relative to the fixed pointer 42 and automatically affording an indication of the weight which has been applied to the scale.

Referring now more particularly to the modified constructions seen in Figs. 3 and 4, the dials 5 are mounted on a spindle 43 which is provided with conical points which are in contact with end bearings 44 secured to the scale housing 10. Mounted on the spindle 43 is a drum 45 around which pass oppositely wound flexible ribbons 12 the ends of which are secured to the segmental faces 46 of the pair of pendulous arms 47 and 64, the spindle 43 and drum 45 being cradled by means of the flexible ribbons 12 between the said arms. The pendulous arm 47 is provided with duplex segmental faces which are spaced apart and the pendulous arm 64 is provided with a single segmental face which is disposed between the two spaced faces of the arm 46 as clearly seen in Fig. 4. The pendulous arms 47 and 64 rock about knife-edges 48 and 65 respectively mounted in bearings 49 and 66 carried by the scale housing. The pendulous arm 47 has adjustable weights 50 and 51 respectively mounted on screwed arms 52 and 53 forming an integral part of the arm 47 and the member 64 in a similar manner has adjustable weights 54 and 55 respectively mounted on screwed arms 56 and 57 which form part of the pendulous arm 64, these weights forming part of the weighing resistant of the scale. The load is transmitted to the pendulous resistant above referred to by means of a connecting rod 36, shackle 37, intermediate lever 58, connecting rod 59 embodying a lost motion linkage 31 in the manner referred to in connection with the first described construction the connecting rod 59 is connected to a pivoted rod 39 secured to the piston 40 of a dashpot 41 and the intermediate lever 58 is provided with a pendulous weight 67 which constitutes part of the weighing resistant of the scale. The rod 59 is dependent from a knife-edge 60 mounted on an arm 61 which projects laterally from the pendulous member 64.

The pendulous resistant arms 47 and 64 oscillate as a pair in the same direction and through a similar arc; and as described in connection with the first mentioned construction, the spindle 43 and drum 45 are substantially supported by means of the ribbons 12 so that the bearings 44 are relieved of the greater part of the weight of the rotary indicating mechanism. In this construction the weight is observed through magnifying lens 68 disposed in the housing 10 a vertical hairline indicator being employed at the rear of the lens to indicate the point at which a reading is to be taken.

Claims:—

1. An indicating mechanism for weighing apparatus comprising an indicator adapted for rotation about a fixed axis, oppositely wound flexible ribbons connected to and forming the suspension for substantially the whole of the weight of the said indicator, pendulous members mounted on and adapted to oscillate about a fixed axis and connected to said ribbons and means for imparting an oscillatory motion to the said members.

2. An indicating mechanism for weighing apparatus comprising a pair of indicating dials, a spindle carrying said dials, pendulous members adapted to oscillate about a fixed axis, and flexible ribbons connected to said members and operatively connected to the said spindle, said ribbons being initially tensioned so that a substantial part of the weight indicator is supported thereby and end thrust bearings adapted to define and determine the fixed axis of rotation of the said indicator.

3. An indicating mechanism for weighing scales comprising an indicator adapted for rotation about a fixed axis, a spindle carrying said indicator, a cylindrical drum mounted on said spindle, pendulous members adapted to oscillate about a fixed axis and flexible ribbons connected to said members and oppositely wound about said drums, said ribbons being initially tensioned so that a substantial part of the weight of the indicator is supported thereby and end thrust bearings adapted to define and determine the fixed axis of rotation of the said indicator.

4. An indicating mechanism for weighing apparatus comprising in combination a scale housing, a pair of indicator dials adapted for rotation about a fixed axis, fixed index pointers mounted on said scale housing, a spindle carrying said dials, cylindrical drums mounted on said spindle, end thrust bearings for said spindle, a lever, adjustable weight resistant members secured to said lever, duplex pendulous segments secured to said lever and hanging vertically below the fulcrum thereof, oppositely wound flexible ribbons connected to said segments and passing round said cylindrical drums, said ribbons being so initially tensioned that they support a substantial part of the weight of said indicator dials and forming with the pendulous segments the means for rotating said dials, a second lever, adjustable weight resistant members secured to said second lever, an intermediate lever in connection with the bottom levers of the scale, connecting rods coupling the intermediate lever to the two levers carrying the weight resistant members, and a lost motion link connection between said connecting rods and said intermediate lever.

In testimony whereof, I have signed my name to this specification.

CAMERON McGREGOR SYKES.